United States Patent
Umayahara

(10) Patent No.: US 8,626,373 B2
(45) Date of Patent: Jan. 7, 2014

(54) FUEL CELL SYSTEM AND CONTROL METHOD OF SAME

(75) Inventor: Kenji Umayahara, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 82 days.

(21) Appl. No.: 13/382,592

(22) PCT Filed: Jul. 9, 2009

(86) PCT No.: PCT/JP2009/062551
§ 371 (c)(1),
(2), (4) Date: Jan. 6, 2012

(87) PCT Pub. No.: WO2011/004488
PCT Pub. Date: Jan. 13, 2011

(65) Prior Publication Data
US 2012/0109444 A1 May 3, 2012

(51) Int. Cl.
*B60L 11/00* (2006.01)
*H02P 7/00* (2006.01)

(52) U.S. Cl.
USPC ............................. 701/22; 318/432; 318/434

(58) Field of Classification Search
USPC .............. 701/22, 99; 318/432, 434, 798, 800, 318/801, 806; 180/65.29, 65.285
See application file for complete search history.

(56) References Cited

U.S. PATENT DOCUMENTS

| | | | | |
|---|---|---|---|---|
| 7,235,937 B2 * | 6/2007 | Takai et al. | ................... | 318/139 |
| 8,342,275 B2 * | 1/2013 | Ojima et al. | ............... | 180/65.31 |
| 2008/0197796 A1 * | 8/2008 | Bae et al. | ...................... | 318/432 |
| 2009/0131215 A1 * | 5/2009 | Shamoto | ........................... | 477/3 |
| 2011/0213518 A1 * | 9/2011 | Welchko et al. | ................ | 701/22 |

FOREIGN PATENT DOCUMENTS

| | | |
|---|---|---|
| DE | 102007049081 A1 | 7/2008 |
| JP | 2002-252932 A | 9/2002 |
| JP | 2005-348530 A | 12/2005 |
| JP | 2008-306784 A | 12/2008 |
| JP | 2009-104825 A | 5/2009 |
| WO | 2009049782 A1 | 4/2009 |

OTHER PUBLICATIONS

International Search Report mailed Oct. 13, 2009 of PCT/JP2009/062551.
Office Action dated Nov. 5, 2013, issued in German Patent Application No. 11 2009 005 050.6 (English translation).

* cited by examiner

*Primary Examiner* — Khoi Tran
*Assistant Examiner* — Robert Nguyen
(74) *Attorney, Agent, or Firm* — Kenyon & Kenyon LLP

(57) ABSTRACT

Provided are a fuel cell system and a control method thereof capable of inhibiting the occurrence of problems caused by surplus electrical power even in cases where the torque able to be generated by the motor is limited due to a low motor drive voltage. A fuel cell system provided with a fuel cell and a motor is further provided with required output torque calculation means for calculating a required output torque based on an output requirement, torque upper limit value calculation means for calculating a torque upper limit value of torque able to be generated by the motor based on a drive voltage of the motor, required motor torque calculation means for calculating a required motor torque based on the required output torque and the torque upper limit value, required motor power calculation means for calculating a required motor power based on the required motor torque, and required generated power calculation means for calculating a required generated power of the fuel cell based on the required motor power.

5 Claims, 8 Drawing Sheets

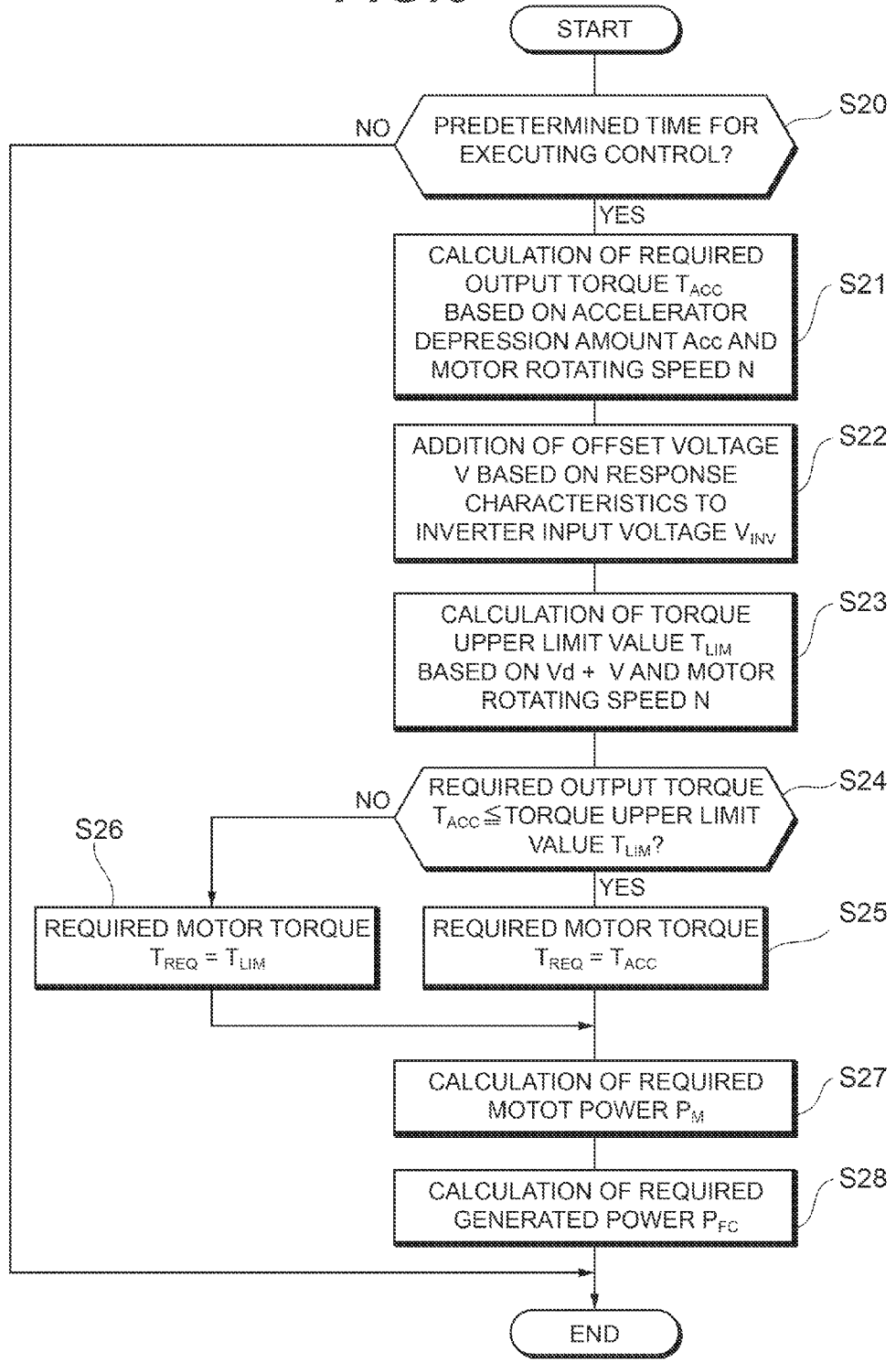

US 8,626,373 B2

FUEL CELL SYSTEM AND CONTROL METHOD OF SAME

This is a 371 national phase application of PCT/JP2009/062551 filed 09 Jul. 2009, the contents of which are incorporated herein by reference.

TECHNICAL FIELD

The present invention relates to a fuel cell system installed in a vehicle, and more particularly, to a hybrid type of fuel cell system that supplies electrical power from a fuel cell and a battery to a motor that drives a vehicle.

BACKGROUND ART

Fuel cell systems installed in vehicles are provided with an inverter for supplying electrical power to a motor from a fuel cell and an energy storage device. For example, Patent Publication JP-A-2005-348530 discloses a fuel cell system provided with two DC-DC converters in addition to an inverter. These consist of a first DC-DC converter that supplies electrical power to the inverter while controlling output voltage of the fuel cell, and a second DC-DC converter that supplies electrical power of an energy storage device while controlling input voltage of the inverter (Patent Literature 1).

According to the invention described in Patent Literature 1, by controlling the first DC-DC converter and setting the output voltage value of the fuel cell to within the range between a maximum value and minimum value of the circuit voltage of the energy storage device, the frequency of execution of a voltage conversion operation can be reduced, thereby making it possible to suppress increases in power loss (Paragraph 0012).

In addition, with respect to controlling power conversion of the inverter, Patent Literature 1 describes that a torque command is calculated based on a signal of an accelerator depression amount related to the amount of depressing operation of an accelerator pedal by a driver, the torque signal is input to the inverter, and current of each phase is output to each phase of the motor in order to generate the required torque (paragraph 0023).

CITATION LIST

Patent Literature

Patent Literature 1: Patent Publication JP-A-2005-348530

SUMMARY OF INVENTION

Technical Problem

However, there is an upper limit on the amount of torque that can be generated by the motor in the case the drive voltage of the motor is low. Even if a torque command is calculated based on an accelerator depression amount and that torque command is ordered to the motor as in Patent Literature 1, in the case drive voltage is low, the motor is unable to drive at the torque specified by the torque order. Moreover, power consumed by the motor is the power that corresponds to the actually generated torque.

Here, in a fuel cell system, in parallel with calculating a torque command based on an accelerator depression amount, a required generated power is also calculated for the fuel cell so that generated power is output an amount able to compensate for the increased required power of the motor corresponding to the torque command. For example, in the fuel system described in the above-mentioned Patent Literature 1, electrical power assuming the case of the motor being driven at the torque specified by the torque command is generated by the fuel cell regardless of whether or not the motor is able to drive at the torque specified by the torque command.

However, in the case the motor is unable to drive at the torque specified by the torque command as described above, since power actually consumed by the motor decreases in comparison with the case of the motor being driven as specified by the torque command, the balance between power generation and power consumption is lost, and a surplus occurs in the power generated by the fuel cell. This surplus of generated power causes overcharging of the energy storage device and leads to damage to the energy storage device or impaired balance of electrical power distribution.

Therefore, in order to solve the above-mentioned problems, a preferable aspect of the invention of the present application provides a fuel cell system and a control method thereof that are capable of inhibiting the occurrence of problems attributable to surplus electrical power by suitably controlling electrical power balance even in the case the drive voltage of the motor is low and there are limitations on the amount of torque that can be generated.

Solution To Problem

One aspect of a fuel cell system that solves the above-mentioned problems is a fuel cell system provided with a fuel cell, a motor connected to enable generated power from the fuel cell to be supplied thereto, and a control device that controls the fuel cell by calculating a required generated power of the fuel cell, the control device calculating a required motor torque based on a required output torque calculated based on an output requirement and a torque upper limit value able to be generated by the motor, the torque upper limit value being calculated correspondingly to a drive voltage of the motor, and calculating the required generated power based on the required motor torque.

Another aspect of a fuel cell system that solves the above-mentioned problems is a fuel cell system provided with a fuel cell and a motor connected to enable generated power from the fuel cell to be supplied thereto, wherein, the fuel cell system is provided with required output torque calculation means for calculating required output torque based on an output requirement, torque upper limit value calculation means for calculating a torque upper limit value able to be generated by the motor based on the drive voltage of the motor, required motor torque calculation means for calculating required motor torque based on the required output torque and the torque upper limit value, required motor power calculation means for calculating required motor power based on the required motor torque, and required generated power calculation means for calculating required generated power of the fuel cell based on the required motor power.

One aspect of a control method of a fuel cell system that solves the above-mentioned problems is a control method of a fuel cell system provided with a fuel cell and a motor connected to enable generated power from the fuel cell to be supplied thereto, wherein the control method is provided with a step for calculating a required output torque based on an output requirement, a step for calculating a torque upper limit value based on the drive voltage of the motor, a step for calculating a required motor torque based on the required output torque and the torque upper limit value, and a step for calculating a required generated power of the fuel cell based on the required motor torque.

There is a limit (upper limit) on the torque able to be generated by a motor corresponding to the drive voltage, and particularly in cases in which drive voltage is low. The power consumed by a motor is determined corresponding to rotating speed in the case of driving at this torque upper limit value. According to the configuration of the invention of the present application, in the case of calculating a required output torque based on an input output requirement, the torque upper limit value is calculated based on the drive voltage of the motor, and the required motor torque is calculated so as not to exceed this torque upper limit value. The required generated power of the fuel cell is then calculated based on the required motor torque of which the upper limit thereof is processed at this torque upper limit value. Consequently, under circumstances in which the motor is only able to be driven up the torque upper limit value even in the case an output requirement requiring torque equal to or greater than the torque upper limit value has been input, a required generated power is calculated that matches the power able to be consumed by the motor driven at the torque upper limit value. Accordingly, problems resulting from the generation of surplus power unable to be consumed by the motor can be avoided.

The following elements can be selectively added to the present invention as desired.

(1) The required output torque may also be calculated based on the accelerator depression amount and the rotating speed of the motor. In the invention of the present application, although an "output requirement" is a value that is input to the fuel cell system, in the case the fuel cell system is installed in a moving body (such as an automobile), this "output requirement" becomes a depression amount of the accelerator (gas pedal). Accordingly, the required output torque in this case is calculated based on the accelerator depression amount and the motor rotating speed.

(2) An inverter may be provided connected to the motor, and the torque upper limit value may be calculated as an upper limit value of torque able to be generated by the motor based on the input voltage of the inverter and the rotating speed of the motor. In a system provided with an inverter serving as an electrical power conversion device that supplies electrical power to a motor, the drive voltage of the motor is a voltage determined corresponding to the input voltage of the inverter, and is, for example, a three-phase alternating current voltage. Accordingly, torque upper limit value in such a system is calculated based on the input voltage of the inverter and the rotating speed of the motor.

(3) The present invention may also be configured so that the torque upper limit value is calculated base on voltage control response characteristics at the input voltage of the inverter. In a system provided with an inverter that supplies electrical power to a motor, drive voltage of the motor corresponds to the input voltage of the inverter, and the input voltage of the inverter is determined based on control characteristics of means for setting the input voltage such as a converter. For example, a change in the input voltage of the inverter is delayed from the time the change is ordered until the input voltage of the inverter changes to the value specified by the command, or in other words, appears as a delay in the voltage control response. According to this configuration, since the torque upper limit value is calculated based on the voltage control response characteristics at the input voltage of the inverter, neither a surplus or shortage of required generated power of the fuel cell is calculated even during a time period in which a delay occurs in control of the input voltage of the inverter.

(4) In the case the required output torque is equal to or less than the torque upper limit value, the required motor torque is calculated as the required output torque, while in the case the required output torque exceeds the torque upper limit value, the required motor torque is calculated as the torque upper limit value. According to this configuration, upper limit processing is executed in which a torque upper limit value is calculated in the case the required output torque exceeds the torque upper limit value.

(5) The required generated power is preferably calculated by adding the required motor power and a required power of a load device other than the motor. According to this configuration, since the required generated torque is calculated to include the required power of a load device other than the motor, the required generated power of the fuel cell can be determined based on an accurate calculation of electrical power balance in the case the required power of the load device is large or in the case of a large number of load devices and the required power determined by totaling that required power becomes large.

Furthermore, the aspects indicated below are considered to be specific aspects of a fuel cell system for solving the above-mentioned problems that include the previously described options.

(1) A fuel cell system provided with an inverter connected to a motor, a first converter that is connected between a fuel cell and the inverter, and sets an output voltage of the fuel cell, a second converter that is connected between an energy storage device and the inverter, and sets an input voltage of the inverter, and a control device that controls the first converter and the second converter; wherein, the control device calculates a required output torque based on an accelerator depression amount and a rotating speed of the motor, calculates a torque upper limit value of torque able to be generated by the motor based on the input voltage of the inverter and the rotating speed of the motor, compares the required output torque and the torque upper limit value and calculates the required output torque as a required motor torque in the case the required output torque is equal to or less than the torque upper limit value while calculates the torque upper limit value as the required motor torque in the case the required output torque exceeds the torque upper limit value, calculates a required motor power based on the calculated required motor torque and the rotating speed of the motor, and calculates a required generated power of the fuel cell based on the required motor power and a required power of a load device.

(2) A fuel cell system provided with an inverter connected to a motor, a first converter that is connected between a fuel cell and the inverter, and sets an output voltage of the fuel cell, a second converter that is connected between an energy storage device and the inverter, and sets an input voltage of the inverter, and a control device that controls the first converter and the second converter; wherein, the control device calculates a required output torque based on an accelerator depression amount and a rotating speed of the motor, calculates a torque upper limit value of torque able to be generated by the motor based on the input voltage of the inverter, the rotating speed of the motor and voltage control response characteristics at the input voltage of the inverter, compares the required output torque and the torque upper limit value and calculates the required output torque as a required motor torque in the case the required output torque is equal to or less than the torque upper limit value while calculates the torque upper limit value as the required motor torque in the case the required output torque exceeds the torque upper limit value, calculates a required motor power based on the calculated required motor torque and the rotating speed of the motor, and calculates a required generation power of the fuel cell based on the required motor power and a required power of a load device.

Advantageous Effects of Invention

According to the invention, since a required motor torque is calculated so as not to exceed a torque upper limit value of torque able to be generated and a required generated power is calculated, problems attributable to the generation of surplus electrical power in an amount unable to be completely consumed by the motor can be avoided.

BRIEF DESCRIPTION OF DRAWINGS

FIG. 9 is a control flow chart of a fuel cell system according to a second embodiment.

DESCRIPTION OF EMBODIMENTS

The following provides an explanation of preferred embodiments for carrying out the present invention with reference to the drawings.

In the following descriptions of the drawings, the same or similar reference symbols are used to indicate the same or similar components. However, the drawings are only intended to be schematic. Thus, specific characteristics and the like should be understood by comparing with the following explanations. In addition, portions are naturally contained in which characteristics mutually differ between drawings. In addition, although all processing is described to be carried out with a single control device in the following embodiments, the case of carrying out control processing according to the present invention by enabling a plurality of control units to operate in concert with each other is also included.

(First Embodiment)

The first embodiment relates to as aspect in which an upper limit is provided for a required motor torque based on an upper limit torque value determined corresponding to an input voltage of an inverter.

(System Configuration)

Figure 1:
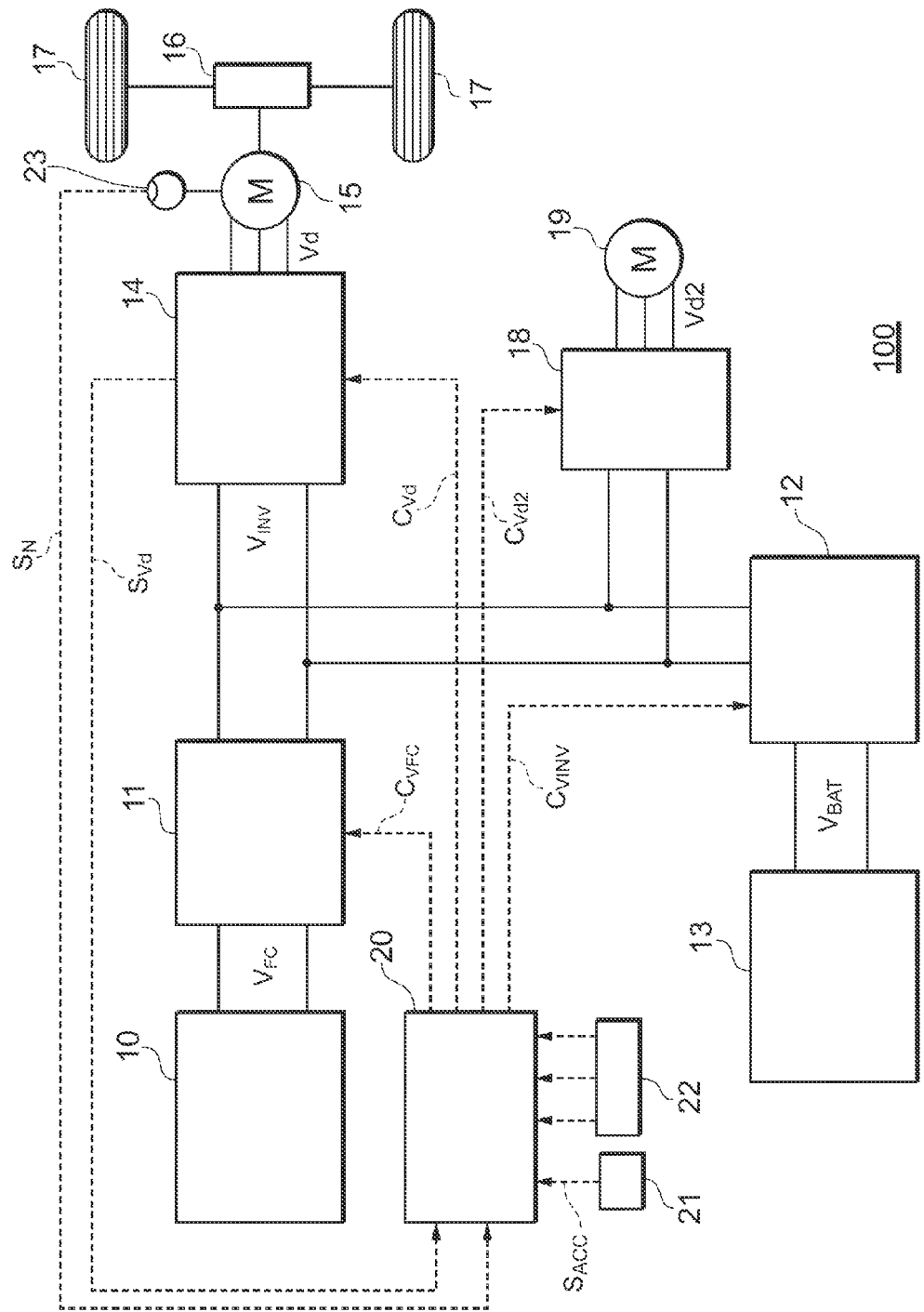
FIG. 1 is system block diagram of an FCHV system according to an embodiment.

FIG. 1 is a block diagram of a fuel cell system 100 installed in a vehicle according to the first embodiment. This type of vehicle is a fuel cell hybrid vehicle (FCHV).

The fuel cell system 100 is configured by being provided with a fuel cell 10, a first converter 11, a second converter 12, a battery 13, an inverter 14, a motor 15, an auxiliary inverter 18, a high-voltage auxiliary device 19 and a control device 20.

The fuel cell 10 is electrical power generation means composed by layering a plurality of unit cells in series. The unit cells have a structure in which a membrane electrode assembly (MEA), consisting of an ion exchange member such as a polymer electrolyte membrane interposed between an anode pole and a cathode pole, is interposed between separators. The anode pole has an anode pole catalyst layer provided on a porous support layer, while the cathode pole has a cathode pole catalyst layer provided on a porous support layer. A fuel gas (such as hydrogen gas) is supplied from a fuel gas supply system not shown to the anode pole of each unit cell via a separator. An oxidizing gas (such as air) is supplied from an oxidizing gas supply system not shown to the cathode pole of each unit cell via a separator. A liquid coolant flow path is formed in the separator, and liquid coolant is supplied from a liquid coolant supply system not shown. In the fuel cell 10, the oxidation reaction of formula (1) occurs at the anode pole, the reduction reaction of formula (2) occurs at the cathode pole, and the electromotive reaction of formula (3) occurs throughout the fuel cell 10.

$$H_2 \rightarrow 2H^+ + 2e^- \qquad (1)$$

$$(½)O_2 + 2H^+ + 2e^- \rightarrow H_2O \qquad (2)$$

$$H_2 + (½)O_2 \rightarrow H_2O \qquad (3)$$

As a result of a plurality of the unit cells being connected in series, the fuel cell 10 outputs an output voltage $V_{FC}$ to an output terminal. The fuel cell 10 has prescribed current-voltage output characteristics, and the output current and output voltage change corresponding to a change in the output voltage $V_{FC}$.

The first converter 11 is a voltage converter that is provided with the configuration of a DC-DC converter. The first converter 11 is provided with a circuit configuration such as that of a three-phase bridge converter in the case a three-phase operating system is used. The three-phase bridge converter is provided with a switching element composed of a reactor, rectifying diode or insulated gate bipolar transistor (IGBT) and the like. Combination of these elements results in the formation of a circuit portion resembling an inverter that temporarily converts input direct current voltage to alternating current, and a portion that re-rectifies the alternating current and converts it to a different direct current voltage. Furthermore, the circuit configuration of the first converter 11 is not limited to that described above, but rather any configuration can be employed that is able to control the output voltage $V_{FC}$ of the fuel cell 10.

An output terminal of the fuel cell 10 is connected to the primary side of the first converter 11, while an input terminal of the inverter 14 is connected to the secondary side. The first converter 11 is configured so as to control the primary side terminal voltage (output voltage $V_{FC}$ of the fuel cell 10) according to a command $CV_{FC}$ from the control device 20. Namely, the output voltage $V_{FC}$ of the fuel cell 10 is controlled to a voltage corresponding to a target voltage (namely, a target output voltage $V_{FC}$) by the first converter 11. In addition, the first converter 11 is configured to convert voltage so as to match the output voltage $V_{FC}$ of the fuel cell 10 and the input voltage $V_{INV}$ of the inverter 14.

The battery 13 is an energy storage device, and functions as a storage source of surplus electrical power generated by the fuel cell 10, a regenerative energy storage source during regenerative braking, and an energy buffer during fluctuations in the load accompanying acceleration or deceleration of a fuel cell vehicle. A secondary battery such as a nickel-cadmium storage battery, nickel-hydrogen storage battery or lithium secondary battery is used for the battery 13. An output voltage $V_{BAT}$ of the battery 13 is the input voltage of the second converter 12.

The second converter 12 is a voltage converter, and is provided with the configuration of a DC-DC converter in the same manner as the first converter 11. An output terminal of the battery 13 is connected to the primary side of the second converter 12, while the input terminal of the inverter 14 is connected to the secondary side. The second converter 12 is configured so as to control the secondary side terminal voltage (input voltage $V_{INV}$ of the inverter 14) according to a command $C_{VINV}$ from the control device 20. For example, in the case the required electrical power of the motor 15 has changed suddenly (and hereinafter presuming the case of having increased), the second converter 12 controls the input voltage $V_{INV}$ of the inverter 14 until it reaches a set target input voltage (required voltage). Furthermore, any configuration that enables control of the input voltage $V_{INV}$ of the inverter 14 can be employed for the circuit configuration of the second converter 12.

The inverter 14 is an electrical power converter, and is configured so as to convert a direct current input voltage supplied to the input terminal to an alternating current voltage and supply that voltage to the motor 15. The circuit configuration of the inverter 14 is provided with, for example, a PWM inverter circuit driven by pulse width modulation. The inverter 14 is configured so as to supply a three-phase alternating current voltage corresponding to the input voltage $V_{INV}$ controlled by the second converter 12 to the motor 15. In addition, it is also configured so as to output a drive voltage (inverter output voltage) Vd currently being output to the control device 20 in the form of a drive voltage signal $S_{Vd}$.

The motor 15 is a traction motor for driving the vehicle, and in the case of being supplied with a drive voltage, imparts thrust to the vehicle, while in the case of decelerating, generates regenerative electrical power. A differential 16 is a reduction device, and is configured so as to reduce high-speed rotation of the motor 15 at a prescribed ratio and rotate a shaft provided with tires 17. A wheel speed sensor and the like not shown is provided on the shaft enabling detection of vehicle speed. A rotating speed sensor 23 detects rotating speed of the motor 15 and outputs a rotating speed signal $S_N$ to the control device 20.

The auxiliary inverter 18 is an electrical power converter, and is configured so as to convert a direct current supplied to the input terminal to alternating current and supply it to the high-voltage auxiliary device 19. The circuit configuration of the auxiliary inverter 18 is the same as that of the above-mentioned inverter 14. The auxiliary inverter 18 is configured so as to supply a three-phase alternating current voltage corresponding to the input voltage $V_{INV}$ controlled by the second converter 12 to the high-voltage auxiliary device 19. Furthermore, the high-voltage auxiliary device 19 is a generic term for a humidifier, air compressor, hydrogen pump or liquid coolant pump and the like not shown for allowing the fuel cell system 100 to function.

The control device 20 is a computer system that controls the fuel cell system 100, and is provided with, for example, a CPU, RAM, ROM and the like. The control device 20 inputs an accelerator depression amount signal $S_{ACC}$ corresponding to accelerator depression amount Acc from an accelerator pedal sensor 21. In addition, the control device 20 inputs various signals from a sensor group 22 and performs various calculations required for control. The sensor group 22 includes, for example, a current sensor that detects output current of the fuel cell 10, a voltage sensor that detects output voltage, a temperature sensor that detects liquid coolant temperature of the fuel cell 10, and rotating speed sensors that detect the rotating speed of an air compressor, hydrogen pump and liquid coolant pump and the like. In addition, the control device 20 inputs the rotating speed signal $S_N$ from the rotating speed sensor 23 that detects a rotating speed N of the motor 15.

The control device 20 controls the entire system by referring to these signals. In providing a general explanation thereof, the control device calculates a required output torque $T_{ACC}$ based on the accelerator depression amount Acc and the motor rotating speed N, and then calculates a required motor torque $T_{REQ}$. The control device 20 then calculates a required motor power $P_M$ based on the required motor torque $T_{REQ}$ and the motor rotating speed N, and then calculates a required generated power $P_{FC}$ based on the required motor power $P_M$ and the high-voltage auxiliary device power $P_{AUX}$. The control device 20 then calculates the output voltage $V_{FC}$ of the fuel cell 10 required to output the required generated power $P_{FC}$ from the current-voltage (I-V) characteristics of the fuel cell 10. The control device 20 determines the respective distribution of output electrical power of the fuel cell 10 and the battery 13. The control device 20 outputs a command $C_{VFC}$ to the first converter 11 and controls the output voltage $V_{FC}$ of the fuel cell 10 so that the determined required electrical power of the fuel cell 10 is obtained. In addition, the control device 20 outputs a command $C_{VINV}$ to the second converter 12 and controls the input voltage $V_{INV}$ of the inverter 14 so that the determined required electrical power of the battery 13 can be extracted. The input voltage $V_{INV}$ of the inverter 14 corresponds to the required motor torque $T_{REQ}$ imparted to the motor 15.

(Function Blocks)

Figure 2:
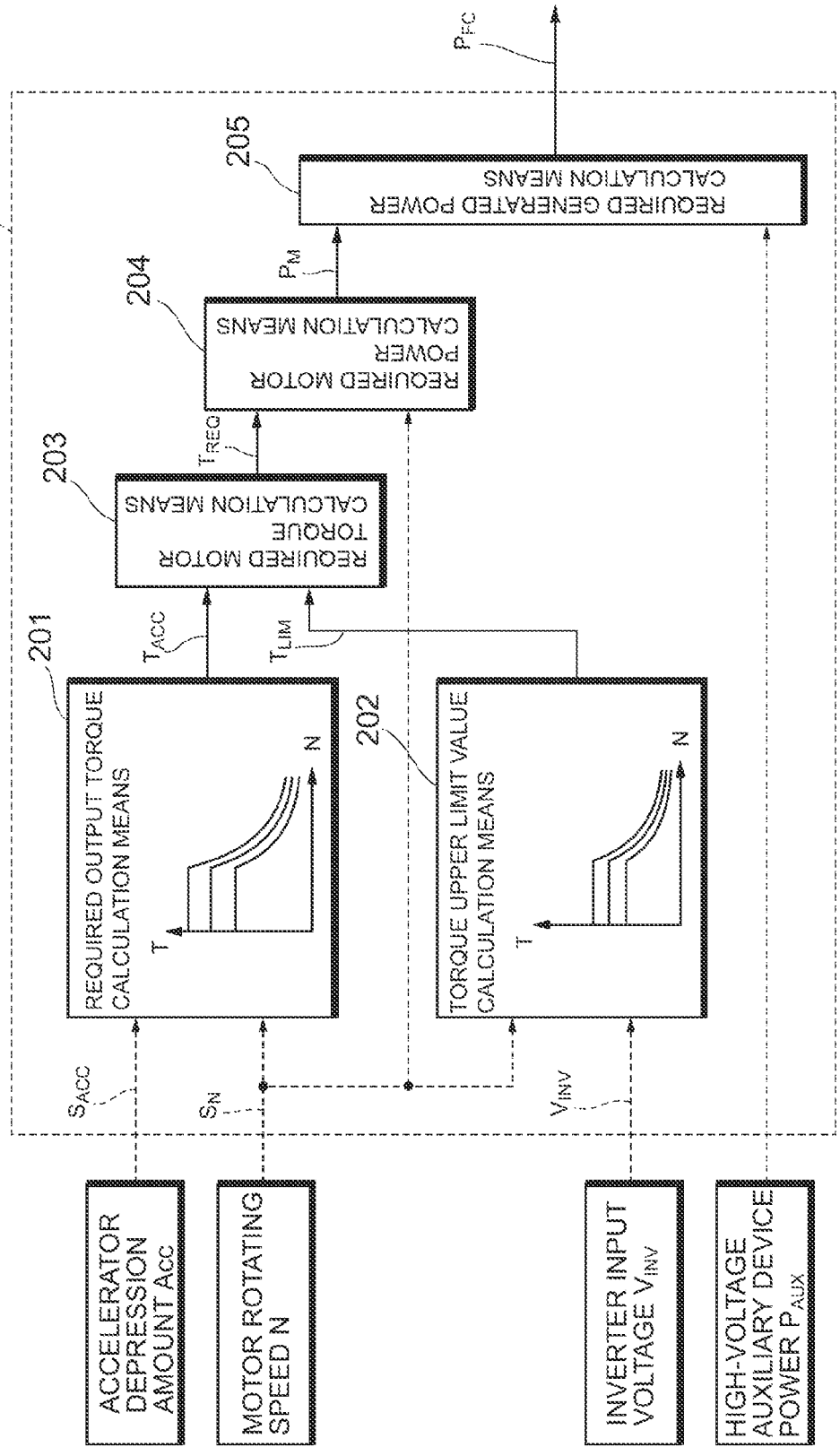
FIG. 2 is a functional block diagram by which fuel cell system control is executed according to a first embodiment.

FIG. 2 is a functional block diagram for controlling the fuel cell system 100 that is realized functionally by the control device 20 in the first embodiment. These function blocks are realized functionally by the control device 20 calling up a program that executes control processing according to the present invention (see FIG. 6) either regularly or irregularly.

Furthermore, the configuration of the function blocks shown in FIG. 2 is divided according to function for the sake of convenience, and functions are not necessarily required to be separated as shown in FIG. 2. Function blocks differing from those shown in FIG. 2 may also be provided as long as the configuration is able to control the output voltage $V_{FC}$ of the fuel cell 10 based on the inputs listed in FIG. 2.

As shown in FIG. 2, the control device 20 is configured by being provided with function blocks consisting of required output torque calculation means 201, torque upper limit value calculation means 202, required motor torque calculation means 203, required motor power calculation means 204 and required generated power calculation means 205.

The required output torque calculation means 201 is a function block that calculates the required output torque $T_{ACC}$ based on the accelerator depression amount Acc acquired from the accelerator depression amount signal $S_{ACC}$ and the rotating speed N of the motor 15 acquired from the rotating speed signal $S_N$. This required output torque is the required torque $T_{REQ}$ inherently required by the motor 15 in consideration of the accelerator depression amount Acc.

Figure 3:
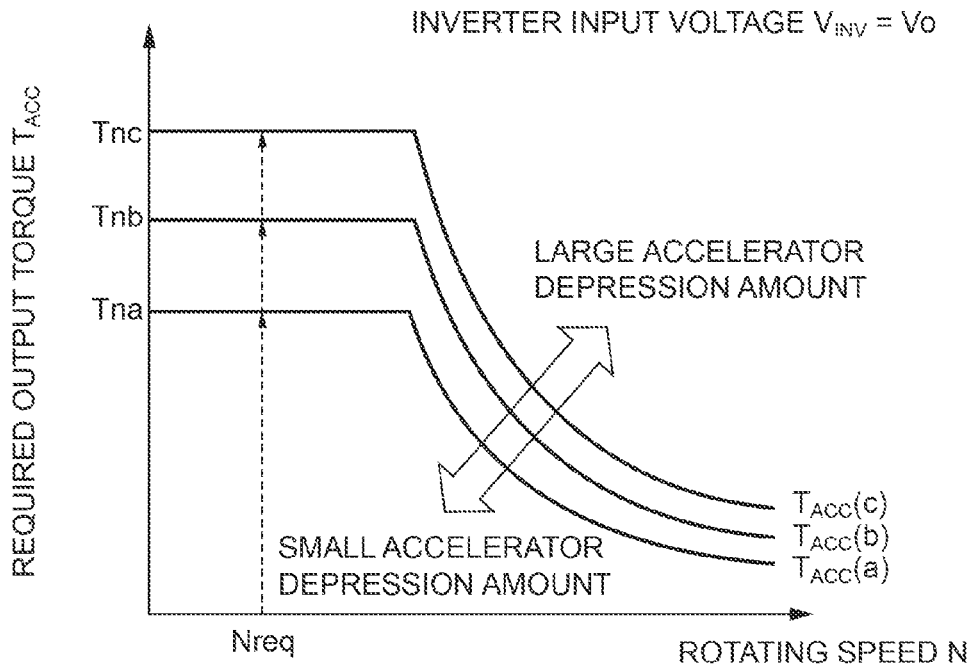
FIG. 3 is a characteristics diagram of rotating speed N versus required output torque $T_{ACC}$ corresponding to accelerator depression amount at a relatively low input voltage $V_{INV}$ of an inverter 14.

FIG. 3 is a characteristics diagram of rotating speed N versus required output torque $T_{ACC}$ corresponding to accelerator depression amount at an ordinary inverter input voltage $V_{INV}$. A typical characteristic of motors is such that when motor rotating speed has been determined, the amount of torque able to be generated corresponding to rotating speed is determined based on prescribed rotating speed-torque characteristics (to be referred to as "N-T characteristics") as shown in FIG. 3. These N-T characteristics are suitable in cases in which the input voltage $V_{INV}$ of the inverter (namely, corresponding to the drive voltage Vd of the motor) is sufficiently high ($V_{INV}$=V0). The N-T characteristics change when the size of the output requirement, such as the accelerator depression amount, changes.

The example shown in FIG. 3 shows examples of an N-T characteristic $T_{ACC}(a)$ when the accelerator depression amount Acc is a depression amount a, an N-T characteristic $T_{ACC}(b)$ when the accelerator depression amount Acc is a depression amount b, and an N-T characteristic $T_{ACC}(c)$ when the accelerator depression amount Acc is a depression amount c. As shown in FIG. 3, in the case the rotating speed N of the motor 15 is Nreq, the required output torque $T_{ACC}$ can be calculated as Tna from the N-T characteristic $T_{ACC}(a)$ when the accelerator depression amount Acc is the depression amount a. The required output torque $T_{ACC}$ can be calculated as Tnb from the N-T characteristic $T_{ACC}(b)$ when the accelerator depression amount Acc is the depression amount b. The required output torque $T_{ACC}$ can be calculated as Tnc from the N-T characteristic $T_{ACC}(c)$ when the accelerator depression amount Acc is the depression amount c. The required output torque calculation means 201 uses the N-T characteristics as shown in FIG. 3 to calculate the required output torque $T_{ACC}$ by storing in the form of a data table or in the form of a relational expression.

In consideration of the input voltage $V_{INV}$ of the inverter 14, namely the required output voltage of the second converter 12, the first embodiment is configured such that, in the case the motor 15 is not able to generate the inherently required torque $T_{REQ}$, the amount of electrical power generated by the fuel cell 10 is limited according to this situation. The function blocks that carry out that processing are the torque upper limit value calculation means 202 and the required motor torque calculation means 203 to be explained next.

The torque upper limit value calculation means 202 is a function block that calculates a torque upper limit value $T_{LIM}$ of torque able to be generated by the motor 15 based on the input voltage $V_{INV}$ of the inverter 14.

Figure 4:
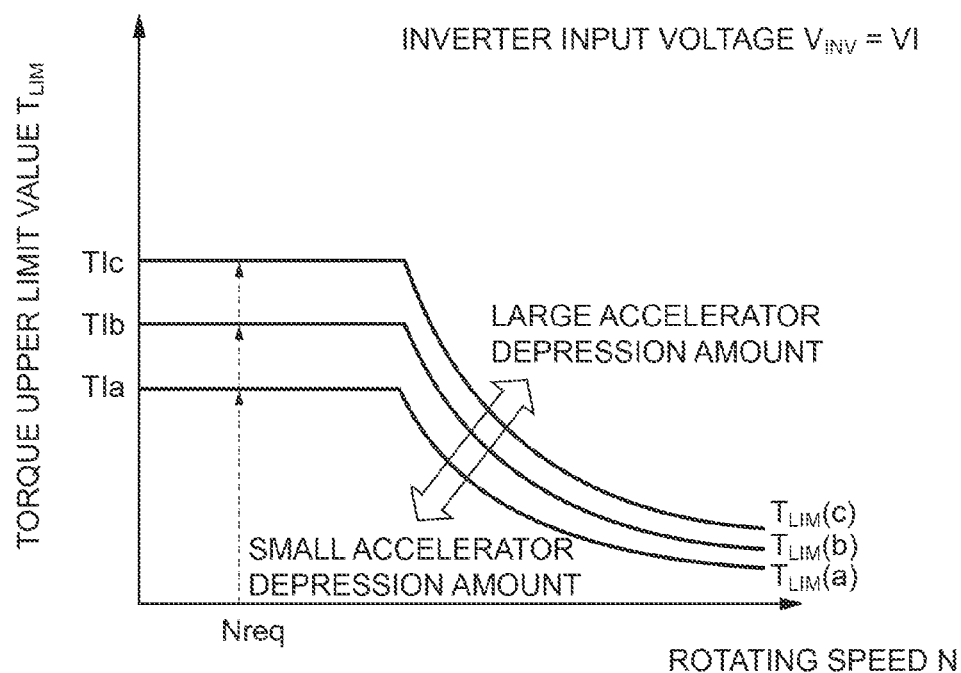
FIG. 4 is a characteristics diagram of rotating speed N versus torque upper limit value $T_{LIM}$ corresponding to accelerator depression amount at a relative low input voltage $V_{INV}$ of an inverter 14.

FIG. 4 shows a characteristics diagram of rotating speed N versus required output torque $T_{ACC}$ corresponding to accelerator depression amount at a relatively low inverter input voltage $V_{INV}$. Differing from the case of FIG. 3 in which the input voltage of the inverter 14 (namely, corresponding to the drive voltage Vd of the motor) is sufficiently high, in a region where the input voltage $V_{INV}$ of the inverter 14 is relatively low ($V_{INV}$=V1(<V0)), torque cannot be generated according to N-T characteristics like those shown in FIG. 3. As shown in FIG. 4, although N-T characteristics are such that the amount of torque that can be generated is determined corresponding to the rotating speed N of the motor, this indicates the maximum value of torque T of the motor 15 able to generated at the input voltage $V_{INV}$ of the inverter 14. When the size of the power requirement such as the accelerator depression amount changes, the torque upper limit value $T_{LIM}$, which defines the upper limit of torque, changes corresponding to the accelerator depression amount. Since the N-T characteristics shown in FIG. 4 change corresponding to the input voltage $V_{INV}$ of the inverter 14, it is preferable to provide in advance several types of N-T characteristics in accommodation of the input voltage $V_{INV}$.

The example of FIG. 4 shows examples of a torque upper limit value characteristic $T_{LIM}(a)$ when the accelerator depression amount Acc is a depression amount a, a torque upper limit value characteristic $T_{LIM}(b)$ when the accelerator depression amount Acc is a depression amount b, and a torque upper limit value characteristic $T_{LIM}(c)$ when the accelerator depression amount Acc is a depression amount c. As shown in FIG. 4, in the case the rotating speed N of the motor 15 is Nreq, the torque upper limit value $T_{LIM}$ can be calculated from the torque upper limit value characteristic $T_{LIM}(a)$ as Tla when the accelerator depression amount Acc is the depression amount a. When the accelerator depression amount Acc is the depression amount b, the torque upper limit value $T_{LIM}$ can be calculated from the torque upper limit value characteristic $T_{LIM}(b)$ as Tlb. When the accelerator depression amount Acc is the depression amount c, the torque upper limit value $T_{LIM}$ can be calculated from the torque upper limit value characteristic $T_{LIM}(c)$ as Tlc. The torque upper limit value calculation means 202 uses the torque upper limit value characteristics as shown in FIG. 4 to calculate the torque upper limit value $T_{LIM}$ by storing in the form of a data table or relational expression.

The required motor torque calculation means 203 is a function block that calculates the required motor torque $T_{REQ}$ based on the calculated required output torque $T_{ACC}$ and torque upper limit value $T_{LIM}$. More specifically, the required motor torque calculation means 203 calculates the required output torque $T_{ACC}$ as the required motor torque $T_{REQ}$ (=$T_{ACC}$) in the case the required output torque $T_{ACC}$ is equal or less than the torque upper limit value $T_{LIM}$. In addition, the required motor torque calculation means 203 calculates the torque upper limit value $T_{LIM}$ as the required motor torque $T_{REQ}$(=$T_{LIM}$) in the case the required output torque $T_{ACC}$ exceeds the torque upper limit value $T_{LIM}$. The upper limit of the required output torque $T_{ACC}$ is processed at the torque upper limit value $T_{LIM}$.

The required motor power calculation means 204 is a function block that calculates required motor power based on the required motor torque $T_{REQ}$. The required motor power $P_M$ is a value obtained by multiplying the rotating speed N by the required motor torque $T_{REQ}$($P_M$=N×$T_{REQ}$).

The required generated power calculation means 205 is a function block that calculates the required generated power $P_{FC}$ of the fuel cell based on the required motor power $P_M$. The required generated power $P_{FC}$ is calculated by adding the required power of a load device other than the motor to the calculated required motor power $P_M$. More specifically, a value determined by adding the high-voltage auxiliary device power $P_{AUX}$ required by the high-voltage auxiliary device 19 to the required motor power $P_M$ is calculated as the required generated power $P_{FC}$.

In the processing described above, the required output torque calculation means 201 determined the required output torque $T_{ACC}$ based on N-T characteristics as shown in FIG. 3, and the torque upper limit value calculation means 202 determined the torque upper limit value $T_{LIM}$ based on N-T characteristics as shown in FIG. 4. The required motor torque calculation means 203 then compared the two and determined the required motor torque $T_{REQ}$. This processing can also be understood from the N-T characteristics of rotating speed N versus required motor torque $T_{REQ}$ corresponding to the input voltage $V_{INV}$ of the inverter 14 determined for each accelerator depression amount Acc as shown in FIG. 5.

Figure 5:
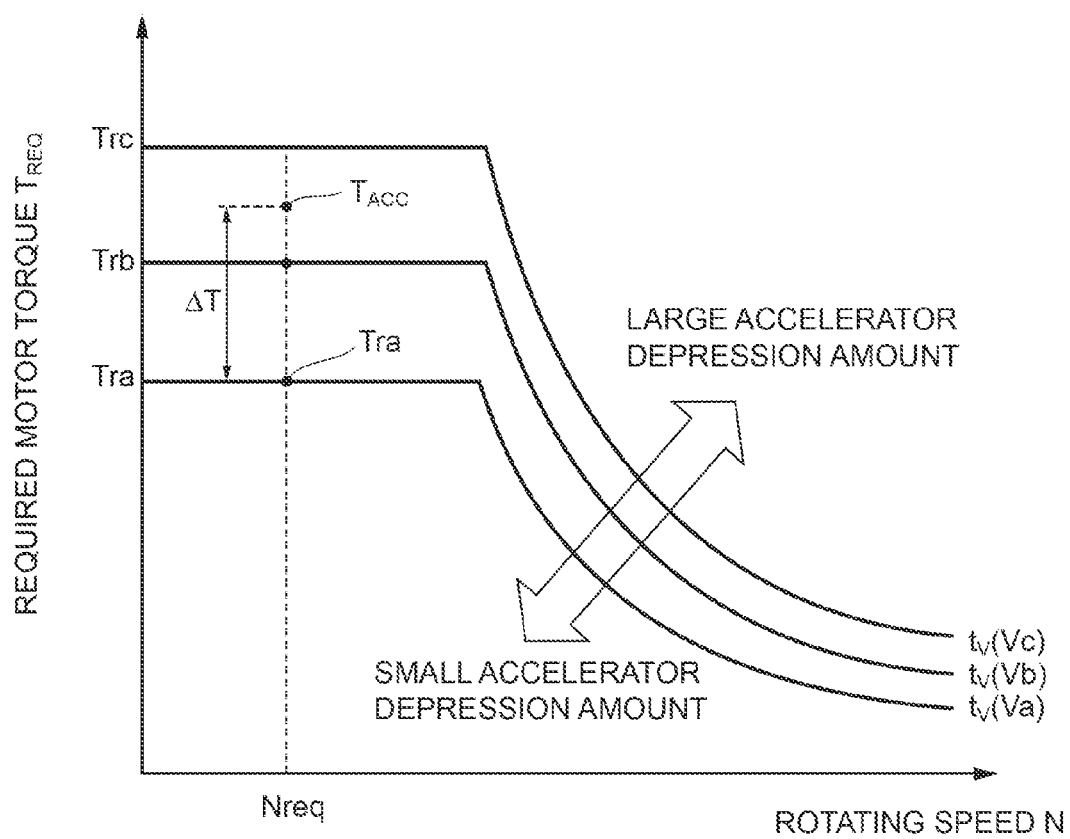
FIG. 5 is a characteristics diagram of rotating speed N versus required motor torque $T_{REQ}$ corresponding to input voltage $V_{INV}$ of an inverter 14.

Once the accelerator depression amount Acc is determined, the N-T characteristics of the rotating speed N versus the required motor torque $T_{REQ}$ are determined corresponding to the input voltage $V_{INV}$ of the inverter 14 as shown in FIG. 5. In FIG. 5, examples are shown of a required motor torque characteristic $t_v(Va)$ when the inverter input voltage $V_{INV}$ is a voltage Va, a required motor torque characteristic $t_v(Vb)$ when the inverter input voltage $V_{INV}$ is a voltage Vb, and a required motor torque characteristic $t_v(Vc)$ when the inverter input voltage $V_{INV}$ is a voltage Vc. As shown in FIG. 5, in the case the rotating speed N of the motor 15 is Nreq, the required motor torque $T_{REQ}$ can be calculated from the motor required torque characteristic $t_v(Va)$ as Tra when the drive voltage is the voltage Va. The required motor torque $T_{REQ}$ can be calculated from the motor required torque characteristic $t_v(Vb)$ as Trb when the drive voltage is the voltage Vb. The required motor torque $T_{REQ}$ can be calculated from the motor required torque characteristic $t_v(Vc)$ as Trc when the drive voltage is the voltage Vc.

Here, as shown in FIG. 5, in the case the input voltage $V_{INV}$ of the inverter is the voltage Va, $T_{ACC}$ is determined to be the required motor torque $T_{REQ}$ based on N-T characteristics as shown in FIG. 3 in the case there is assumed to be no limitation by the torque upper limit value $T_{LIM}$. In reality, however, the motor 15 has torque upper limit characteristics as shown in FIG. 4. Consequently, in the case the inverter input voltage $V_{INV}$ is the voltage Va, the torque Tra, which is limited by the torque upper limit value $T_{LIM}$, is determined to be the required motor torque $T_{REQ}$. A power $\Delta P(=Nreq \times \Delta T)$, which corresponds to a difference $\Delta T(=T_{ACC}-Tra)$ between the required motor torque $T_{ACC}$ in the case of assuming the absence of torque limitation and the required motor torque Tra determined by including torque limitation, is surplus electrical power attributable to the absence of torque limitation. According to the present invention, as a result of this suitable torque limitation processing, the generation of the surplus power $\Delta P$ in terms of electrical power balance is prohibited, thereby successfully inhibiting the generation of surplus electrical power.

Furthermore, processing by the required output torque calculation means 201, the torque upper limit value calculation means 202 and the required motor torque calculation means 203 can be simplified by using N-T characteristics of rotating speed N versus motor required torque $T_{REQ}$ corresponding to the input voltage $V_{INV}$ of the inverter 14 as shown in FIG. 5. For example, N-T characteristics as shown in FIG. 5 are measured in advance for each accelerator depression amount Acc, and those characteristics are stored in the form of a data table or in the form of a relational expression. The required motor torque $T_{REQ}$ is then specified by referring to the data table or relational expression using the accelerator depression amount Acc, the rotating speed N of the motor 15 and the input voltage $V_{INV}$ of the inverter 14 as input values. As a result of this processing, a required motor torque $T_{REQ}$, which has been limited corresponding to the torque upper limit value $T_{LIM}$, can be determined by referring to a data table or relational expression only once.

(Operation)

Figure 6:
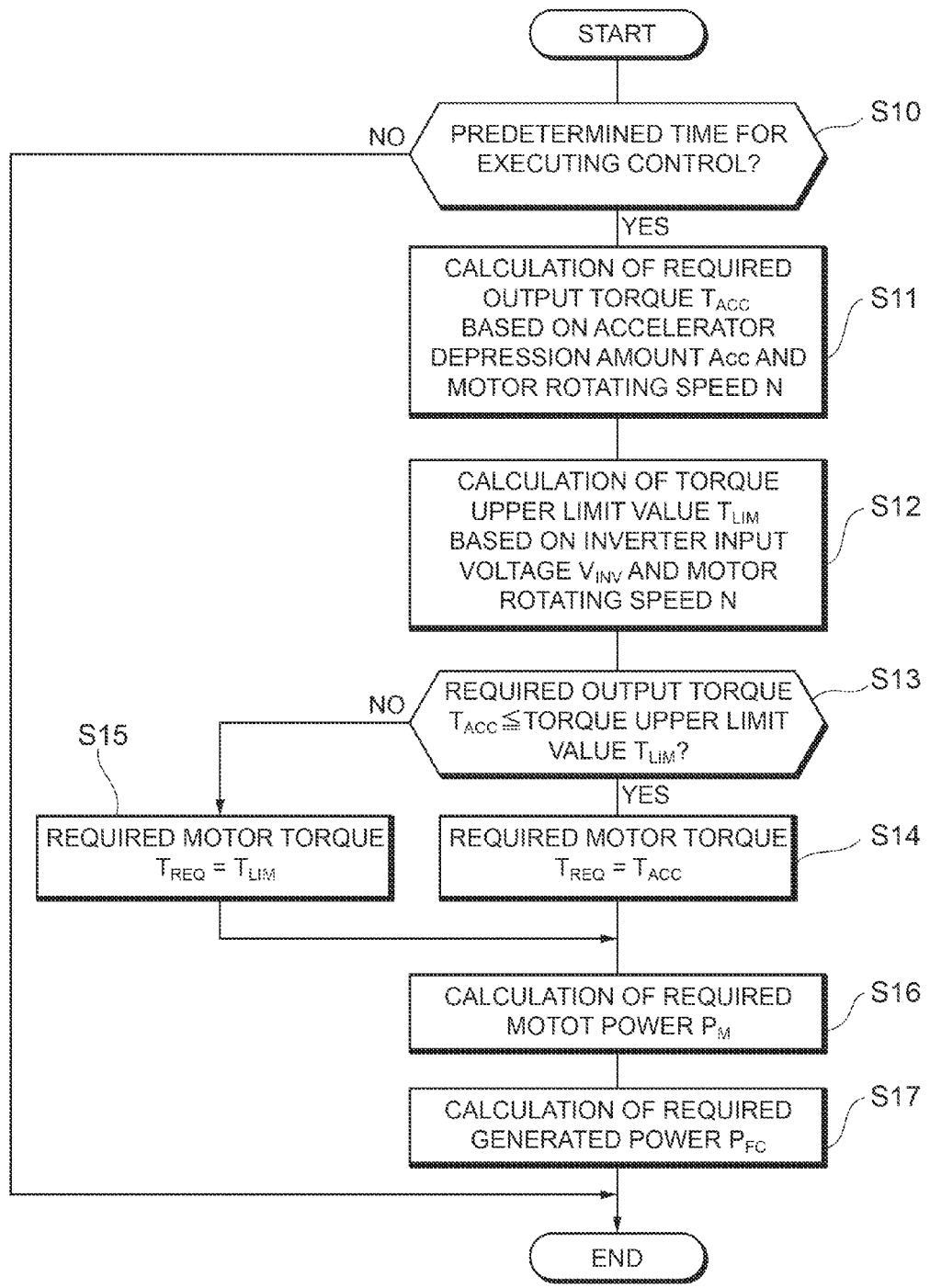
FIG. 6 is a control flow chart of a fuel cell system according to a first embodiment.

Next, an explanation is provided of control processing of the fuel cell system 100 of the first embodiment realized with the above-mentioned function blocks with reference to the flow chart of FIG. 6. The following control processing is a processing set that is repeatedly executed at regular or irregular intervals. For example, in the present embodiment, a program that executes control processing as shown in FIG. 6 is called up within the control device 20 for each prescribed control cycle Tint.

In step S10, the control device 20 determines whether or not it is time to execute control according to the control cycle Tint. As a result of that determination, in the case a time for executing control has arrived (YES), processing proceeds to step S11, the required output torque calculation means 201 shown in FIG. 2 reads the accelerator depression amount signal $S_{ACC}$ from the accelerator pedal sensor 21, and reads the rotating speed signal $S_N$ from the rotating speed sensor 23. The required output torque calculation means 201 then calculates the required output torque $T_{ACC}$ based on the accelerator depression amount Acc indicated by the accelerator depression amount signal $S_{ACC}$ and the motor rotating speed N indicated by the rotating speed signal $S_N$. Namely, the required output torque calculation means 201 refers to a data table or relational expression indicating N-T characteristics as shown in FIG. 3, specifies rotating speed N-required output torque characteristics $T_{ACC}(Acc)$ corresponding to the accelerator depression amount Acc, and calculates the required output torque $T_{ACC}$ corresponding to the motor rotating speed N from those N-T characteristics.

Next, processing proceeds to step S12, and the torque upper limit value calculation means 202 shown in FIG. 2 acquires the current input voltage $V_{INV}$ of the inverter 14. The torque upper limit value calculation means 202 then refers to a data table or relational expression indicating N-T characteristics as shown in FIG. 4 corresponding to the acquired inverter input voltage $V_{INV}$. The torque upper limit value calculation means 202 then specifies torque upper limit value characteristics $T_{LIM}(Acc)$ corresponding to the accelerator depression amount Acc and calculates the torque upper limit value $T_{LIM}$ corresponding to the motor rotating speed N from those N-T characteristics.

Next, in step S13, the required motor torque calculation means 203 shown in FIG. 2 compares the calculated required output torque $T_{ACC}$ and torque upper limit value $T_{LIM}$. As a result of comparison, in the case the required output torque $T_{ACC}$ is equal to or less than the torque upper limit value $T_{LIM}$ (YES), processing proceeds to step S14, and the required motor torque calculation means 203 calculates the required output torque $T_{ACC}$ as the required motor torque $T_{REQ}$ ($=T_{ACC}$). On the other hand, in the case the required output torque $T_{ACC}$ exceeds the torque upper limit value $T_{LIM}$ as a result of the above-mentioned comparison (NO), processing proceeds to step S15 and the required motor torque calculation means 203 calculates the torque upper limit value $T_{LIM}$ as the required motor torque $T_{REQ}(=T_{LIM})$.

Next, processing proceeds to step S16, and the required motor power calculation means 204 shown in FIG. 2 calculates the required motor power based on the required motor torque $T_{REQ}$. More specifically, a value determined by multiplying the rotating speed N by the required motor torque $T_{REQ}$ is calculated as the required motor power $P_M(=N \times T_{REQ})$.

Next, processing proceeds to step S17, and the required generated power calculation means 205 calculates the required generated power $P_{FC}$ of the fuel cell based on the required motor power $P_M$. More specifically, a value determined by adding the calculated required motor power $P_M$ and the high-voltage auxiliary device power $P_{AUX}$ required by the high-pressure auxiliary device 19 is calculated as the required generated power $P_{FC}$.

Furthermore, in the case it has been determined in step S10 that it is not time to execute control (NO), control processing is not executed and processing ends.

Subsequently, the control device 20 determines the output voltage $V_{FC}$ to enable the fuel cell 10 to output the required generated power based on the I-V characteristics of the fuel cell 10, and outputs the command $C_{VFC}$ for controlling to this output voltage $V_{FC}$ to the first converter 11. As a result of this processing, neither a surplus or shortage of generated power corresponding to the required generated power $P_{FC}$ is output from the fuel cell 10. Since this generated power is equal to the electrical power consumed by the motor 15 that has undergone torque upper limit processing, the occurrence of a surplus of electrical power is inhibited.

(Advantages of the First Embodiment)

The following advantages are obtained according to the first embodiment.

(1) According to the first embodiment, in the case of calculating the required output torque $T_{ACC}$ based on the accelerator depression amount that has been input as an output requirement, the torque upper limit value $T_{LIM}$ is calculated based on the inverter input voltage $V_{INV}$, and the required motor torque $T_{ACC}$ is calculated so as not exceed this torque upper limit value $T_{LIM}$. The required generated power $P_{FC}$ of the fuel cell 10 is calculated based on the required motor torque $T_{REQ}$ that has undergone upper limit processing with the torque upper limit value $T_{LIM}$. Consequently, even if the accelerator depression amount Acc requires torque equal or greater than the torque upper limit value $T_{LIM}$, under circumstances such that the motor 15 can only be driven up to the torque upper limit value $T_{LIM}$, a required generated power $P_{FC}$ is generated that matches the power able to be consumed by the motor 15 driven at the torque upper limit value $T_{LIM}$. Accordingly, problems resulting from the generation of surplus power unable to be completely consumed by the motor 15 can be avoided.

(2) According to the first embodiment, since the required output torque $T_{ACC}$ is calculated based on the accelerator depression amount Acc and the rotating speed N of the motor 15, it is suitable for a fuel cell system 100 installed in a vehicle.

(3) According to the first embodiment, since the torque upper limit value $T_{LIM}$ is stored corresponding to the inverter input voltage $V_{INV}$, the motor rotating speed N and the accelerator depression amount Acc, a suitable torque upper limit value $T_{LIM}$ can be determined.

(4) According to the first embodiment, since the torque upper limit value $T_{LIM}$ is calculated to be the required motor torque $T_{REQ}$ in the case the required output torque $T_{ACC}$ exceeds the torque upper limit value $T_{RIM}$, the required motor torque $T_{REQ}$ can be made to actually conform to the torque generated by the motor 15.

(5) According to the first embodiment, since the required generated power $P_{FC}$ is determined by adding high-voltage auxiliary device power $P_{AUX}$ consumed by the high-voltage auxiliary device 19 to the required motor power $P_M$, the required generated power $P_{FC}$ can be calculated that reflects a suitable electrical power balance.

(Second Embodiment)

The second embodiment relates to a control method of the fuel cell system 100 that takes into consideration voltage control response characteristics of the inverter 14.

Since the second embodiment is similar to the above-mentioned first embodiment explained based on FIG. 1 with respect to the configuration of the fuel cell system 100, the same reference symbols are used and an explanation thereof is omitted.

Figure 7:
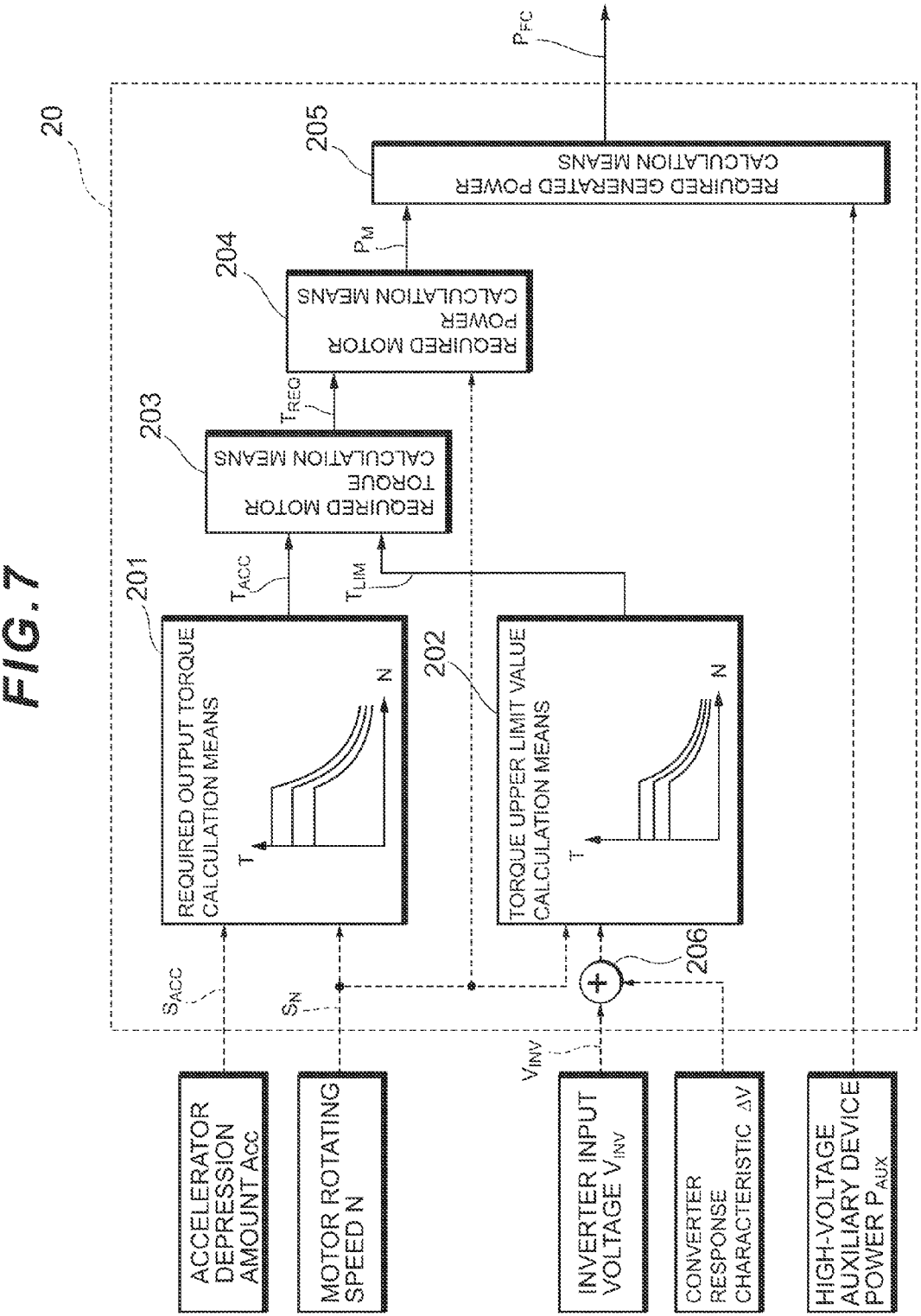
FIG. 7 is a functional block diagram by which fuel cell system control is executed according to a second embodiment.

FIG. 7 is a functional block diagram for controlling the fuel cell system 100 that is realized functionally by the control device 20 in the second embodiment. These function blocks are realized functionally by the control device 20 calling up a program that executes control processing according to the present invention (see FIG. 9) either regularly or irregularly.

Furthermore, the configuration of the function blocks shown in FIG. 7 is divided according to function for the sake of convenience, and functions are not necessarily required to be separated as shown in FIG. 7. Function blocks differing from those shown in FIG. 7 may also be provided as long as the configuration is able to control the output voltage $V_{FC}$ of the fuel cell 10 based on the inputs listed in FIG. 7.

As shown in FIG. 7, the control device 20 is configured by being provided with function blocks consisting of the required output torque calculation means 201, the torque upper limit value calculation means 202, the required motor torque calculation means 203, the required motor power calculation means 204, the required generated power calculation means 205 and addition means 206. Since the required output torque calculation means 201, the torque upper limit value calculation means 202, the required motor torque calculation means 203, the required motor power calculation means 204 and the required generated power calculation means 205 are the same as explained for the above-mentioned first embodiment, an explanation thereof is omitted.

In particular, the second embodiment differs from the above-mentioned first embodiment with respect to being provided with the addition means 206. This addition means 206 is a function block for adding the input voltage $V_{INV}$ of the inverter 14 to a voltage offset $\Delta V$ derived from voltage control response characteristics of the second converter 12. Namely, the torque upper limit value calculation means 202 is characterized by being input with the sum of the inverter input voltage $V_{INV}$ and the offset voltage $\Delta V$ (=$V_{INV}+\Delta V$). The technical significance of adding the offset voltage $\Delta V$ based on the voltage control response characteristics of the second converter 12 to the inverter input voltage $V_{INV}$ is explained below based on FIG. 8.

Figure 8:
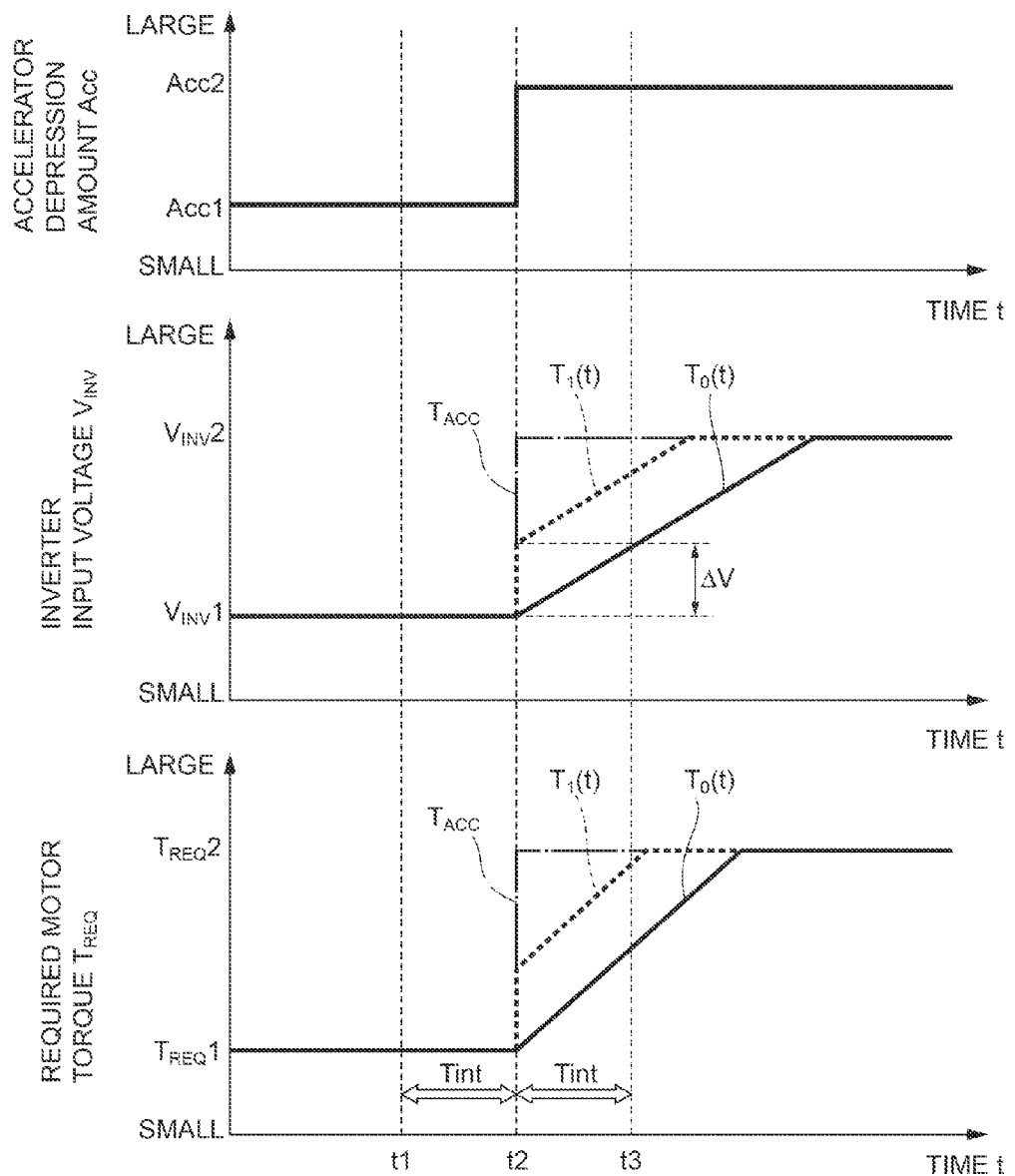
FIG. 8 is a timing chart for explaining response characteristics of accelerator depression amount Acc, inverter input voltage $V_{INV}$ and required motor torque $T_{REQ}$.

FIG. 8 shows a timing chart for explaining response characteristics of the accelerator depression amount Acc, the inverter input voltage $V_{INV}$ and the required motor torque $T_{REQ}$. FIG. 8 indicates response control in the case of the control cycle Tint relating to control of the fuel cell system 100 arriving at times t1, t2 and t3 in that order.

An accelerator depression amount Acc1 is assumed to be input for the accelerator depression amount Acc until the time t1. In accommodation thereof, an inverter input voltage $V_{INV}1$ is output from the second converter 12 for the inverter input voltage $V_{INV}$, and a required motor torque $T_{REQ}1$ is output for the required motor torque $T_{REQ}$.

At the current time t2, the accelerator is assumed to be depressed and the accelerator depression amount Acc is assumed to have changed from Acc1 to Acc2. As has been previously explained in the first embodiment, in the case the accelerator depression amount Acc has changed, the required output torque calculation means 201 shown in FIG. 7 changes the required output torque $T_{ACC}$, and the required motor torque calculation means 203 changes the required motor torque $T_{REQ}$.

Here, the second converter 12 serving as the actuating device generates a control delay corresponding to prescribed output response characteristics extending from the time the command $C_{VINV}$ is designated as a command value that causes the required inverter input voltage $V_{INV}$ to be output until the time that command value is reflected in the output voltage. For example, in the example shown in FIG. 8, in response to the accelerator depression amount Acc having changed from Acc1 to Acc2, the command $C_{VINV}$ is ordered to the second converter 12 at the time t2 so as to change the inverter input voltage $V_{INV}$ from $V_{INV}1$ to $V_{INV}2$. After having received this command, the second converter 12 changes the output voltage thereof starting at the time t2. The response characteristic of this output voltage is, for example, a linear change. Here, an output response characteristic $V_0(t)$ of the second converter 12 can be approximated with, for example, the relational expression of equation (4) when the time t2 is taken to be the starting point.

$$V_0(t)=\Delta V \cdot t/\text{Tint}+V_{INV}1 \quad (4)$$

The output response characteristic $V_0(t)$ shown in equation (4) is a response characteristic such that the voltage changes by $\Delta V$ when the control cycle Tint has elapsed. Namely, the input voltage of the inverter 14 increases by $\Delta V$ each time an amount of time equivalent to the control cycle Tint elapses. When the required inverter input voltage $V_{INV}2$ is reached, the input voltage $V_{INV}$ of the inverter 14 becomes a constant value ($V_{INV}2$).

Since the second converter 12 has output response characteristics as described above, even if the command $C_{VINV}$, which changes the required output voltage (=$V_{IN}$) of the second converter 12 in response to a change in the accelerator depression amount Acc, is transmitted, the change in the input voltage of the inverter 14 does not occur instantaneously. Accordingly, the inverter input voltage $V_{INV}$ that is input to the torque upper limit value calculation means 202 shown in FIG. 7 in order to calculate the torque upper limit value $T_{LIM}$ does not change from the input voltage $V_{INV}$ of the inverter 14 at the time immediately prior to execution of control. Namely, as shown in FIG. 8, the input voltage of the inverter 14 input to the torque upper limit value calculation means 202 at the time t2 remains at nearly $V_{INV}1$ (=$V_0(t2)$).

Here, due to the delay attributable to the output response characteristics $V_0(t)$ of the second converter 12 as described above and electrical power generation response characteristics of the fuel cell 10, the required generated power $P_{FC}$ calculated by the control device 20 at the time t2 is actually reflected at the time t3. Accordingly, the required generated power $P_{FC}$ to be calculated at the time t2 must be calculated based on the torque upper limit value $T_{LIM}$ presumed to exist at the time t3. Consequently, in order to determine the correct torque upper limit value $T_{LIM}$ at the time t3, the input voltage of the inverter 14 input at the time t3 (=$V_0(t3)$=$V_{INV}1+\Delta V$) must be input to the torque upper limit value calculation means 202 at the time t2.

Therefore, in the second embodiment, an offset voltage $\Delta V$ presumed to be generated from the response characteristic $V_0(t)$ of the second converter 12 after the control cycle Tint has elapsed is preliminarily added to the input voltage $V_{INV}$ of the inverter 14 by the addition means 206 of FIG. 7 followed by input to the torque upper limit value calculation means 202. The voltage input to the torque upper limit value calculation means 202 corresponds to $V_1(t)$ of equation (5).

$$V_1(t)=V_0(t)+\Delta V \quad (5)$$

In the case processing is not executed in this manner, the required motor torque $T_{REQ}$ calculated by the required motor torque calculation means 203 changes in the manner indicated by $T_0(t)$ of FIG. 8. In the second embodiment, since the required motor torque $T_{REQ}$ is calculated based on the offset voltage $\Delta V$ of the output voltage presumed to be generated after the control cycle Tint has elapsed as previously described, the required motor torque $T_{REQ}$ as indicated by $T_1(t)$ of FIG. 8 is calculated as the calculated value. Furthermore, $T_{ACC}$ is the required motor torque $T_{REQ}$ in the case of assuming that a delay attributable to output response characteristics does not occur.

Next, an explanation is provided of control processing of the fuel cell system 100 of the second embodiment realized with the above-mentioned function blocks with reference to the flow chart of FIG. 9. The following control processing is a processing set that is repeatedly executed at regular or irregular intervals. For example, in the present embodiment, a program that executes control processing as shown in FIG. 9 is called up within the control device 20 for each prescribed control cycle Tint.

In step S20, the control device 20 determines whether or not it is time to execute control according to the control cycle Tint. As a result of that determination, in the case a time for executing control has arrived (YES), the required output torque calculations means 201 shown in FIG. 7 proceeds to step S21 and calculates the required output torque $T_{ACC}$ based on the accelerator depression amount Acc indicated by the accelerator depression amount signal $S_{ACC}$ and the motor rotating speed N indicated by the rotating speed signal $S_N$ in the same manner as step S11 of FIG. 6.

Next, processing proceeds to step S22, and the addition means 206 shown in FIG. 7 inputs the input voltage $V_{INV}$ of the inverter 14. In addition, the addition means 206 inputs the offset voltage $\Delta V$ determined according to the preliminarily measured output response characteristic $V_0(t)$ of the second converter 12 (see equation (4)). A voltage value obtained by adding the detected input voltage $V_{INV}$ of the inverter 14 and the presumed offset voltage $\Delta V$ is then output to the torque upper limit value calculation means 202.

Next, processing proceeds to step S23, and the torque upper limit value calculation means 202 shown in FIG. 7 refers to a data table or relational expression indicating N-T characteristics as shown in FIG. 4 in the same manner as step S12 in FIG. 6. The torque upper limit value calculation means 202 then specifies the torque upper limit value characteristic $T_{LIM}(Acc)$ corresponding to the accelerator depression amount Acc, and calculates the torque upper limit value $T_{LIM}$ corresponding to the motor rotating speed N from the N-T characteristics. At this time, the N-T characteristics that are referred to are the N-T characteristics in the case the inverter input voltage is $V_{INV}+\Delta V$.

Next, in step S24, the required motor torque calculation means 203 shown in FIG. 7 compares the calculated required output torque $T_{ACC}$ and torque upper limit value $T_{LIM}$ in the same manner as step S13 in FIG. 6. As a result of comparison, in the case the required output torque $T_{ACC}$ is equal to or less than the torque upper limit value $T_{LIM}$ (YES), processing proceeds to step S25, and the required motor torque calculation means 203 calculates the required output torque $T_{ACC}$ as the required motor torque $T_{REQ}$ (=$T_{ACC}$). On the other hand, in the case the required output torque $T_{ACC}$ exceeds the torque upper limit value $T_{LIM}$ as a result of the above-mentioned comparison (NO), processing proceeds to step S26 and the required motor torque calculation means 203 calculates the torque upper limit value $T_{LIM}$ as the required motor torque $T_{REQ}$(=$T_{LIM}$).

Next, processing proceeds to step S27, and the required motor power calculation means 204 shown in FIG. 7 calculates the required motor power based on the required motor torque $T_{REQ}$ in the same manner as step S16 of FIG. 6.

Next, processing proceeds to step S28, and the required generated power calculation means 205 shown in FIG. 7 calculates the required generated power $P_{FC}$ of the fuel cell based on the required motor power $P_M$ in the same manner as step S17 of FIG. 6.

Furthermore, in the case it has been determined in step S20 that it is not time to execute control (NO), control processing is not executed and processing ends.

Subsequently, the control device 20 determines the output voltage $V_{FC}$ to enable the fuel cell 10 to output the required generated power based on the I-V characteristics of the fuel cell 10, and outputs the command $C_{VFC}$ for controlling to this output voltage $V_{FC}$ to the first converter 11.

According to the second embodiment as previously described, even in the case a delay derived from output response characteristics has occurred in the second converter 12 and the like, neither a surplus or shortage of generated power corresponding to the required generated power $P_{FC}$ is output from the fuel cell 10. Since this generated power is equal to the electrical power consumed by the motor 15 that has undergone torque upper limit processing, the occurrence of a surplus of electrical power is inhibited.

(Variations)

The present invention is not limited to the above-mentioned embodiments, but rather can also be suitably modified prior to application within a range that does not conflict with the gist of the present invention.

For example, although the present invention was applied to the fuel cell system 100 provided with the first converter 11, the second converter 12 and the inverter 14 in the above-mentioned embodiments, the present invention is not limited thereto. The present invention can also be applied to a fuel cell system provided with one DC-DC converter or three or more DC-DC converters.

In addition, the motor 15 may also enable direct current driving, allowing the present invention to also be applied to a fuel cell system not requiring the inverter 14. Such a fuel cell system may be used by detecting the input voltage of the motor 15 instead of the input voltage of the inverter.

In addition, the motor 15 is not necessarily required to be a motor for vehicle driving. The present invention can be applied to any motor provided it is a motor that has an upper limit on torque generated corresponding to drive voltage.

In addition, although the accelerator (gas pedal) depression amount Acc was input as an output requirement in the above-mentioned embodiments, the present invention is not limited thereto. For example, in the case of a mounted fuel cell system, there may be no operating means present that is equivalent to an accelerator. Such a system may be configured so as to use information relating to an output requirement other than an accelerator.

Industrial Applicability

The fuel cell system and control method thereof of the present invention is not limited to a vehicle, but rather can be applied by installing in another type of moving body. Examples of applicable moving bodies include trains, ships, aircraft and submarines. In addition, the fuel cell system and control method thereof of the present invention are not limited to application to moving bodies in the manner of a vehicle, but rather can also be applied to stationary power supply systems and portable power supply systems.

Reference Signs List

10: fuel cell, 11: first converter, 12: second converter, 13: battery, 14: inverter, 15: motor, 16: differential, 17: tire, 18: auxiliary inverter, 19: high-voltage auxiliary device, 20: control device, 21: accelerator pedal sensor, 22: sensor group, 23: rotating speed sensor, 100: fuel cell system, 201: required output torque calculation means, 202: torque upper limit value calculation means, 203: required motor torque calculation means, 204: required motor power calculation means, 205: required generated power calculation means, 206: addition means, Acc: accelerator depression amount, N: motor rotating speed, $P_{AUX}$: high-voltage auxiliary device power, $P_{FC}$: required generated power, $P_M$: required motor power, $S_{ACC}$: accelerator depression amount signal, $S_N$: rotating speed signal, $S_{Vd}$: drive voltage signal, T: torque, $T_{ACC}$: required output torque, Tint: control cycle, $T_{LIM}$: torque upper limit value, $T_{REQ}$: required motor torque, $V_{BAT}$: output voltage, Vd: drive voltage, Vd2: drive voltage, $V_{FC}$: output voltage, $V_{FC}$: target output voltage, $V_{INV}$: inverter 14 input voltage, $\Delta V$: offset voltage

I claim:

1. A control method of a fuel cell system provided with:
a fuel cell;
a motor connected to enable generated power from the fuel cell to be supplied thereto; an inverter connected to the motor; and
a converter that sets an input voltage of the inverter,
the method comprising the steps of:
calculating, by a required output torque calculation device, a required motor output torque based on an output requirement;
calculating, by a torque upper limit value calculation device, a torque upper limit value of torque able to be generated by the motor;
comparing, by a required motor torque calculation device, the required output torque and the torque upper limit value and calculating the required output torque as a required motor torque in the case the required output torque is equal to or less than the torque upper limit value while calculating the torque upper limit value as the required motor torque in the case the required output torque exceeds the torque upper limit value;
calculating, by a required motor power calculation device, a required motor power based on the required motor torque; and
calculating, by a required generated power calculation device, a required generated power of the fuel cell based on the required motor power,
the torque upper limit value being calculated based on a sum obtained by adding an offset voltage based on voltage control response characteristics of the converter to the input voltage of the inverter.

2. A fuel cell system, comprising:
a fuel cell;
a motor connected to enable generated power from the fuel cell to be supplied thereto;
an inverter connected to the motor; and
a converter that sets an input voltage of the inverter,
the fuel cell system further comprising:
a required output torque calculation device that calculates a required motor output torque based on an output requirement;
a torque upper limit value calculation device that calculates a torque upper limit value of torque able to be generated by the motor;
a required motor torque calculation device that compares the required output torque and the torque upper limit value and calculates the required output torque as a required motor torque in the case the required output torque is equal to or less than the torque upper limit value while calculating the torque upper limit value as the required motor torque in the case the required output torque exceeds the torque upper limit value;
a required motor power calculation device that calculates a required motor power based on the required motor torque; and
a required generated power calculation device that calculates a required generated power of the fuel cell based on the required motor power,
the torque upper limit value calculation device calculating the torque upper limit value based on a sum obtained by adding an offset voltage based on voltage control response characteristics of the converter to the input voltage of the inverter.

3. The fuel cell system according to claim 2, wherein
the torque upper limit value calculation device calculates the torque upper limit value based on the sum and a rotating speed of the motor.

4. The fuel cell system according to claim 2, wherein
the required output torque calculation device calculates the required output torque based on an accelerator depression amount and a rotating speed of the motor.

5. The fuel cell system according to claim 2, wherein
the required generated power calculation device calculates the required generated power of the fuel cell by adding the required motor power and a required power of a load device other than the motor.

\* \* \* \* \*

UNITED STATES PATENT AND TRADEMARK OFFICE
CERTIFICATE OF CORRECTION

PATENT NO. : 8,626,373 B2
APPLICATION NO. : 13/382592
DATED : January 7, 2014
INVENTOR(S) : Kenji Umayahara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 116 days.

Signed and Sealed this
Twenty-second Day of September, 2015

Michelle K. Lee
*Director of the United States Patent and Trademark Office*